United States Patent
Guo et al.

(10) Patent No.: US 10,304,115 B2
(45) Date of Patent: May 28, 2019

(54) QUANTIFICATION OF USER RECEPTIVENESS VIA MACHINE LEARNING

(71) Applicant: Uber Technologies, Inc., San Francisco, CA (US)

(72) Inventors: Fei Guo, Sunnyvale, CA (US); Xinyu Tang, Cupertino, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 551 days.

(21) Appl. No.: 15/163,496

(22) Filed: May 24, 2016

(65) Prior Publication Data
US 2017/0345078 A1    Nov. 30, 2017

(51) Int. Cl.
*G06Q 30/06* (2012.01)
*H04L 29/08* (2006.01)
*G06N 20/00* (2019.01)

(52) U.S. Cl.
CPC ......... *G06Q 30/0631* (2013.01); *G06N 20/00* (2019.01); *H04L 67/22* (2013.01)

(58) Field of Classification Search
None
See application file for complete search history.

(56) References Cited

U.S. PATENT DOCUMENTS

| | | | |
|---|---|---|---|
| 9,282,073 B1* | 3/2016 | Avital | H04L 51/02 |
| 2014/0180826 A1* | 6/2014 | Boal | G06Q 30/0245 |
| | | | 705/14.66 |
| 2014/0249873 A1* | 9/2014 | Stephan | G06Q 10/063 |
| | | | 705/7.11 |
| 2015/0170175 A1* | 6/2015 | Zhang | G06O 30/0204 |
| | | | 705/7.33 |
| 2016/0140604 A1* | 5/2016 | Blackhurst | G06Q 30/0246 |
| | | | 705/14.45 |
| 2016/0171534 A1* | 6/2016 | Linden | G06Q 30/0255 |
| | | | 705/14.53 |
| 2016/0225025 A1* | 8/2016 | Sinha | G06Q 30/0257 |
| 2016/0253710 A1* | 9/2016 | Publicover | H04W 4/21 |
| | | | 705/14.66 |
| 2016/0364606 A1* | 12/2016 | Conway | G06K 9/00302 |
| 2017/0134508 A1* | 5/2017 | Kalis | H04L 67/18 |

* cited by examiner

*Primary Examiner* — Mila Airapetian
(74) *Attorney, Agent, or Firm* — Fenwick & West LLP

(57) ABSTRACT

A server provides communications to users and evaluates actions of the users after the provision of the communications to determine how receptive the various users are to such communications. Receptiveness is determined through a training process involving the formation of training sets based on whether users a test set of users were receptive to a previous set of communications, the derivation of relevant features for the users of the training set, the training of a model based on the derived features, and the use of the model for users whose receptiveness is to be estimated. With the most receptive users identified, the server can focus in future on communicating with those most receptive users.

16 Claims, 3 Drawing Sheets

QUANTIFICATION OF USER RECEPTIVENESS VIA MACHINE LEARNING

FIELD OF ART

The present disclosure generally relates to the field of machine learning, and more specifically, to estimating degrees to which users are influenced by system communications.

BACKGROUND

Different system users have different degrees of responsiveness to communications of a system. Companies and other organizations would prefer to focus their communications on the users that will be most receptive to them. Unfortunately, it is difficult to formulate a set of ad hoc rules that accurately capture the variety and subtle interactions of different factors that influence the responsiveness of a user to a communication.

SUMMARY

Examples provided herein describe a system to target specific users to share specified data with in order to facilitate the increased use of a computing platform. In some examples, the system can correspond to or be a part of a service arrangement system that provides a platform or network service to enable users to request location-based services using their respective computing devices and to select service providers to provide the requested services. In order to generate more interest and usage of the platform, the system can provide content or notifications to certain users or potential users of the system. As opposed to a system notifying or communicating with all user devices in a given region or country, examples described herein provide a system that computes scores or values for users based on models in order to transmit communications to only an identified sub-set of users in the given region, thereby reducing the overall volume of communications or messages transmitted by the system and reducing the strain on the bandwidth of the system's network.

According to some examples, a computer-implemented method performed by a computing system (e.g., one or more servers) comprises sending communications to a set of registered users; receiving interactions from the registered users; identifying, based on the received interactions, a positive set of users that were influenced by the communications and/or a negative set of users that were not influenced by the communications; deriving user features for users of the positive set of users and for users of the negative set of users; training an influence prediction model based on the derived user features; for a first user, extracting first user features; obtaining a first influence score for the first user from the influence prediction model by providing the first features as input to the influence prediction model; obtaining a first value estimate for the first user; determining a first value score for the first user based on the first influence score and the first value estimate; and responsive to the first value score of the first user being higher than value scores of other users, identifying the first user as a high value user.

In one embodiment, a computer-implemented method comprises sending communications to a set of users; receiving interactions from the users; identifying, based on the received interactions, a set of users that were influenced by the communications; training an influence prediction model based on the identified set of users; obtaining a first influence score for a first user from the influence prediction model by providing the first features as input to the influence prediction model; and based at least in part on the first influence score, identifying the first user as a high value user.

In one embodiment, a non-transitory computer-readable storage medium stores instructions executable by a processor, the instructions comprising: instructions for sending communications to a set of users; instructions for receiving interactions from the users; instructions for identifying, based on the received interactions, a set of users that were influenced by the communications; instructions for training an influence prediction model based on the identified set of users; instructions for obtaining a first influence score for a first user from the influence prediction model by providing the first features as input to the influence prediction model; and instructions for, based at least in part on the first influence score, identifying the first user as a high value user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following description that alternative embodiments of the structures and methods illustrated herein may be employed without departing from the examples described herein.

DETAILED DESCRIPTION

Figure 1:
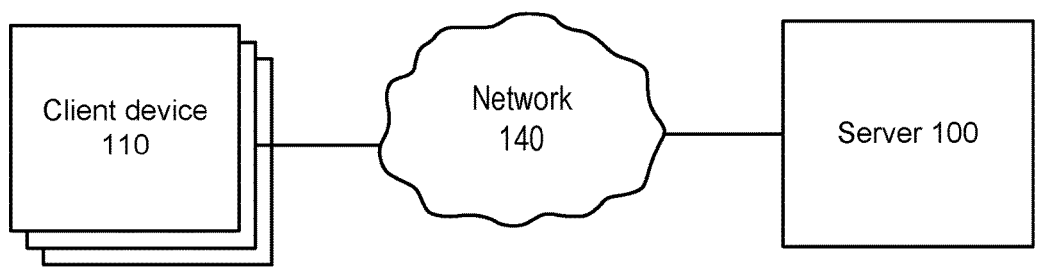
FIG. 1 illustrates a detailed view of an environment in which users use their client devices interact with a server, such as to conduct transactions with a company or other organization responsible for the server.

FIG. 1 illustrates a detailed view of an environment in which users use their client devices 110 to interact with a server 100, such as to conduct transactions with a company or other organization responsible for the server 100. For example, the server 100 can provide a network service to enable users to request location-based services using their respective designated client applications. The server 100 can process the requests to identify service providers to provide the requested services for the users. Still further, the server 100 generates and provides communications to the users' client devices 110 over a network(s) 140 and evaluates actions of the users after the provision of the communications to determine how receptive the various users are to such communications. With the most receptive users identified, the server 100 can focus in future on those most receptive users. One possible example of the environment depicted in FIG. 1 is UBER TECHNOLOGIES, INC.'s network ("UBER network"), in which users use their client devices 110 to communicate via the UBER network to arrange transportation services.

The client device 110 can correspond to a computing device, such as a smart phone, tablet computer, laptop, or any other device that can communicate over the network 140 with the server(s) 100. Although for simplicity only one server 100 and several client devices 110 are illustrated in the environment FIG. 1, it is appreciated that there may be any number of both client devices 110 and servers 100 within the environment.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
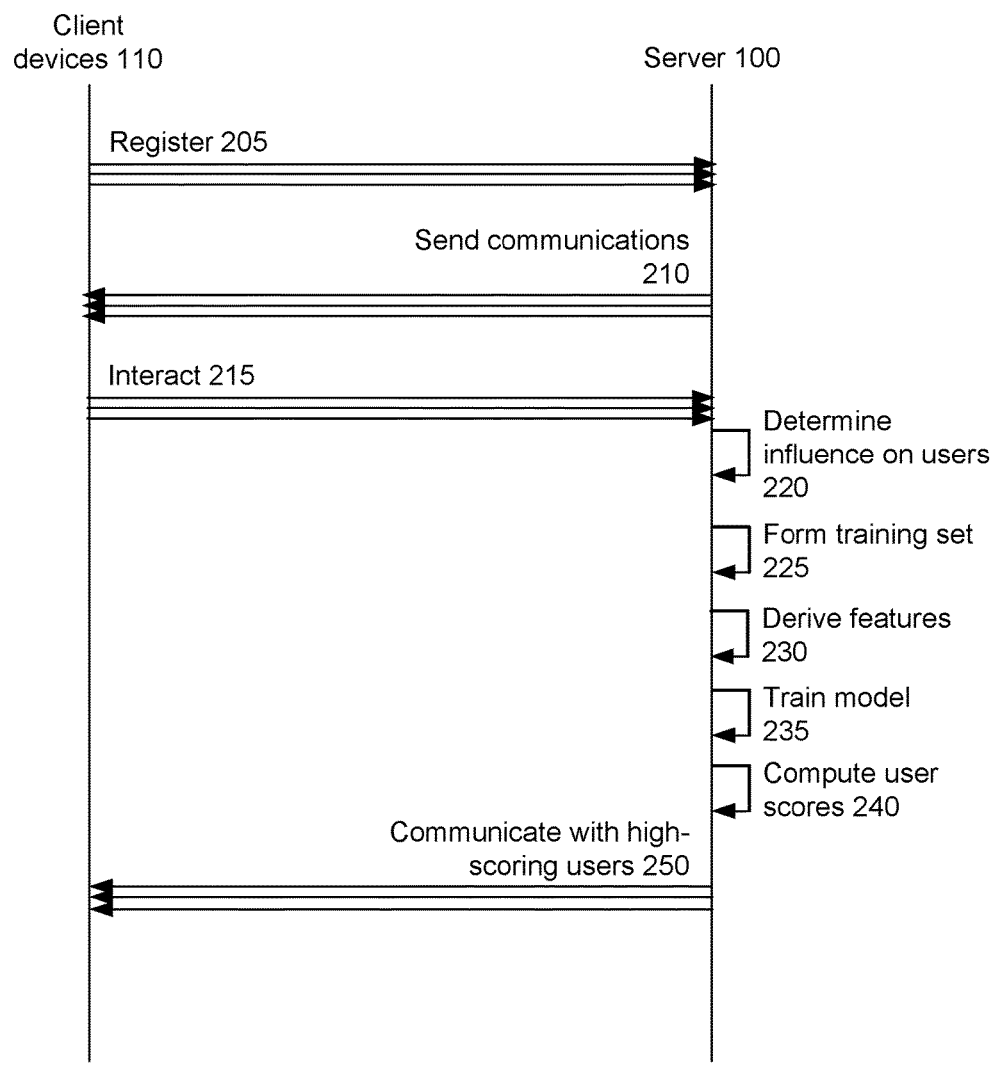
FIG. 2 illustrates actions taking place between the client devices and the server as part of the identifying and targeting of receptive users, according to one embodiment.

FIG. 2 illustrates actions taking place between the client devices 110 and the server 100 as part of the identifying and targeting of receptive users, according to one embodiment.

In one embodiment, the users use their client devices 110 to register 205 with the server 100, e.g., by creating accounts. The use of explicitly-created user accounts, and access of the registered users to the server 100 as part of a session in which the identify themselves to the server through login, increases the ability of the server 100 to associate the users with the actions taken by those users, which increases the accuracy of the training of later steps.

At this point, the server 100 may lack information that allows it to distinguish between different users with respect to how they will react to communications from the server 100. For example, the organization responsible for the server may wish to send some form of promotions to the users in order to induce them to purchase a product or service. For instance, the promotion could take the form of a discount on future purchases, such as 50% off the price of the next trip arranged through the server 100.

Accordingly, the server 100 sends 210 communications to some set of its users. The sent communications are designed to induce a desired reaction on the part of the users, such as increasing their purchases relative to some prior baseline of their purchases. For example, the communications could be promotions such as discounts on a specified number of purchases for a specified period of time.

The users, via their client devices 110, interact 215 with the server 100 after the sending 210 of the communications. For example, depending on the nature of the organization providing the server 100, the users might make purchases (e.g., sign up for transportation services, purchase items in an online store), view information, communicate information to others (e.g., chat about or publicize a product, service, or other aspect of the organization), etc. The server 100 associates these actions with the users (e.g., based on registered usernames/logins used by the users).

The server 100 determines 220 the influence that the communications had on the users, based on the interactions 215 of the users subsequent to the sending 210 of the communications. In one embodiment, the server 100 computes a Boolean value for each user, indicating whether the corresponding user did or did not take sufficient actions to satisfy a given criterion indicating having been influenced by the communications. For instance, returning to the example of the server 100 being used to arrange for transportation services, the criterion might be a user arranging three trips over the next week after the sending of a promotional communication to the user, or the user increasing the aggregate price of the trips by 50% over the user's prior month of usage. In other embodiments, the server 100 computes a numeric value (e.g., a real number) that quantifies the extent to which the communications influenced user behavior.

Based on the determined influences of the communications on users to whom the communications were sent 210, the server 100 forms 225 a training set. In one embodiment, the server 100 forms a positive training set consisting of the users determined to have been sufficiently influenced by the communications (e.g., depending on the embodiment, those with the Boolean value "true", or those with computed numeric values greater than some threshold), and a negative training set of users determined not to have been sufficiently influenced.

The server derives 230 features for each user of the training sets. The features indicate attributes of the users that may be of relevance to whether the users are influenced by the communications. For example, in one embodiment the features include the following:

Email properties: E.g., the domain of the email (e.g., gmail.com) used by the user to initially register 205 with the server 100.

Registration age: Length of time since the user first registered 205 with the server 100.

Registration to purchase: Time from the user's first registration 205 with the server 100 until the first purchase using the server (e.g., the first trip arranged).

Technology platform: Properties of the client device 110 used by the user (e.g., the operating system, such as Android or iOS for a smart phone client device).

Channel: The channel from which the user registered, such as referral, organic, or marketing campaign.

Payment method: The form of payment that the user uses to purchase goods or services via the server 100, such as credit card, cash, APPLE PAY, etc.

Promotion sensitivity: The percentage of the discount offered on purchases to the user as part of a promotion communication.

Purchase features, including location, time, and frequency of purchases. For example, for an embodiment in which the server 100 is directed to supporting the arranging of trips, the purchase features include the following:

Total trips per time unit (e.g., per week).

Trip frequency gradient over a time period (e.g., a linear regression, e.g., over the last month).

Distribution of trip pickup region by geolocation (e.g., geohash), over some most recent time period, and over the user's whole history.

Distribution of trip dropoff region by geolocation (e.g., geohash), over some most recent time period, and over the user's whole history.

Distribution of average trip frequency for time of day (e.g., by hour).

Distribution of average trip frequency for day of week.

P10, P50, and P90 values of trip duration distribution. ("PN" is a statistical measure denoting the value of a distribution such that N % of the distribution values are greater than that value.)

P10, P50, and P90 values of trip waiting time from dispatch to pickup.

P10, P50, and P90 values of estimated trip waiting time from dispatch to pickup.

P10, P50, and P90 values of trip distances.

P50 and P90 values of surge multiplier.

Average user rating (over some most recent time period, and over the user's whole history).

The server 100 uses machine learning to train 235 an influence prediction model based on the features derived for the users of the training set. The trained influence prediction model outputs, for a given user, an influence score indicating how receptive to/influenced by a communication the given user is likely to be. In one embodiment, the server 100 uses gradient boosting, producing an influence prediction model with 500 trees of depth 3. Other embodiments employ other training algorithms, such as logistic regression, random forest, naive Bayes, Bayesian networks, or artificial neural networks.

In one embodiment, a single influence prediction model is trained. In other embodiments, a different influence prediction model is trained for different values of an attribute of interest, such as a different influence prediction model for each of a set of cities in which users purchase the products/services in question.

With the model(s) having been trained 235 from the training set of users, the server 100 uses the model to predict, for any given user (not just users of the training set) how influenced the users will be by communications from the server 100.

Specifically, the server 100 computes 240 a user value score for each of the users, using the model. To do so, the server 100 derives, for each user for whom a score is being computed, values of the same set of features that were derived in step 230, and provides these values as input to the model from step 235. The influence prediction model outputs an influence score indicating how receptive to/influenced by a communication the given user is likely to be.

In one embodiment, the user value score for a user is based not only on the user influence score for that user, but also on a user value estimate for that user. For example, in one embodiment the user value score for a user is defined as the product of the user influence score and the user value estimate. The user value estimate for a user represents some measure of a monetary value that the user will provide if the user is, in fact, influenced by the communications from the server 100, as defined by the criterion evaluated in step 220 (e.g., the user arranging three trips over the next week after the sending of a promotional communication to the user). The user value estimate may be defined in different manners in different embodiments. For one embodiment in which the server 100 is directed to supporting the arranging of trips, the user value estimate is defined as:

$$(P90\_trips\_per\_week - rolling\_average\_current\_trips\_per\_week) * average\_trip\_fare$$

where (for the user in question) "P90_trips_per_week" is the statistical P90 value of the number of trips taken each week, "rolling_average_current_trips_per_week" is the average number of trips per week for some recent time period, and "average_trip_fare" is the average amount paid by the user for the trips.

With the user scores computed 240, the server 100 in future can focus its user communications by communicating 250 in particular with the high-scoring users. That is, the server 100 identifies some set of the users that have the highest user value scores (e.g., the top-scoring N users, or top-scoring P % of users), and identifies them as high-value users, focuses its communications on those high-value users. The communication 250 may be direct (e.g., displayed to the user on a website made available by a web server of the server 100), or indirect (e.g., through advertisements served as part of content provided by others than the server 100, e.g., as part of search results, associated with digital videos, and the like).

In that case of communications that have an associated cost, such as advertisements, or promotions offering reduced prices, communicating more with the high-scoring users, and less with the lower-scoring users, tends to increase revenue by maximizing the return on investment of the communications. (For example, it is preferable to provide a promotion to a user that is likely to make 6 purchases per week after the initial promotion than to provide it to a user that is likely not to make further purchases after the promotion.)

It is appreciated that the interactions and entities illustrated in FIG. 2 could differ in different embodiments. For example, the operations 220-240 could be performed on a system other than a server 100. As another example, the registration of step 205 need not take place provided that the features derived at step 230 can be associated in some other way with particular users (e.g., with cookies and machine identifiers of anonymous users). As yet another example, the server need not itself send 210 communications and receive interactions 215, provided that it can obtain data from which to derive 230 features in some other manner.

Figure 3:
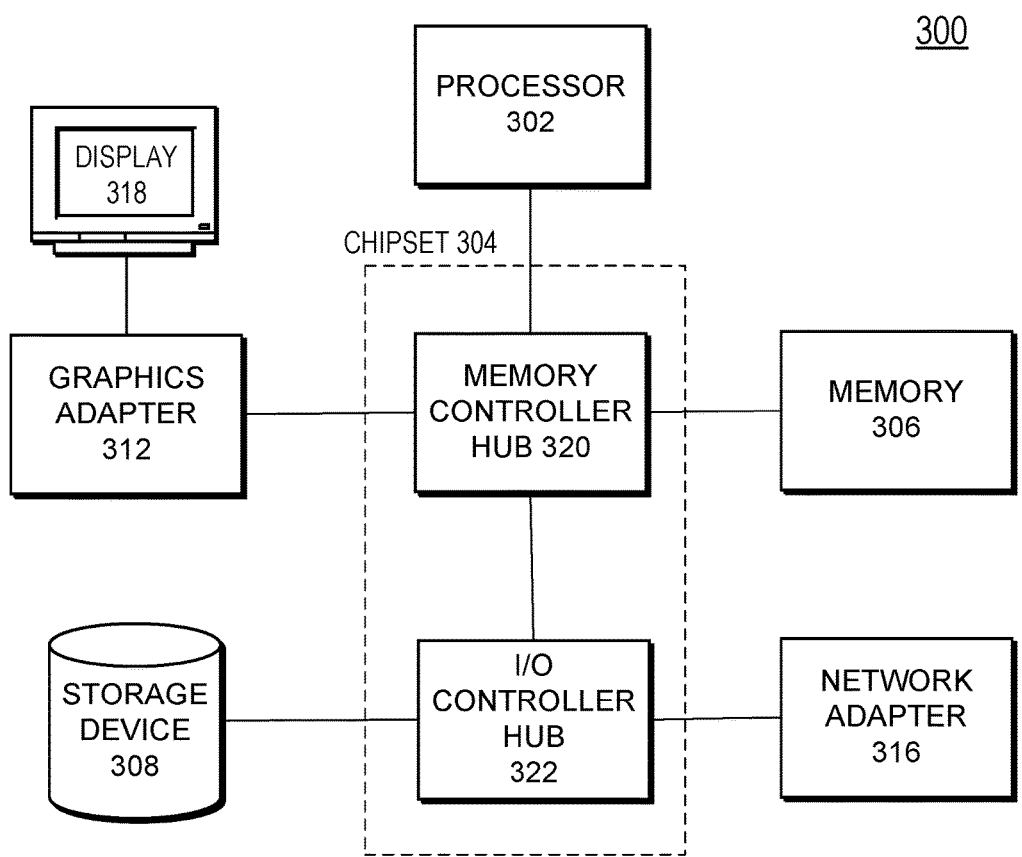
FIG. 3 is a high-level block diagram illustrating physical components of a computer used as part or all of the server or client device from FIG. 1, according to one embodiment.

FIG. 3 is a high-level block diagram illustrating physical components of a computer 300 used as part or all of the server 100 or client device 110 from FIG. 1, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 such as a server or smartphone may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a server, comprising:
   sending communications to a set of registered users;
   receiving interactions from the registered users;
   identifying, based on the received interactions, a positive set of users that were influenced by the communications and a negative set of users that were not influenced by the communications;
   deriving user features for users of the positive set of users and for users of the negative set of users;
   training an influence prediction model based on the derived user features;
   for a first user, extracting first user features;
   obtaining a first influence score for the first user from the influence prediction model by providing the first features as input to the influence prediction model;
   obtaining a first value estimate for the first user;
   determining a first value score for the first user based on the first influence score and the first value estimate; and
   responsive to the first value score of the first user being higher than value scores of other users, identifying the first user as a high value user.

2. A computer-implemented method comprising:
   sending communications to a set of users;
   receiving interactions from the users;
   identifying, based on the received interactions, a set of users that were influenced by the communications;
   training an influence prediction model based on the identified set of users, wherein the training comprises deriving user features for users of the set of users that were influenced by the communications, and wherein the user features for the users comprise at least one of: email domains of the users, length of time since registration of the users, or length of time from registration of the users to first purchase by the users;
   obtaining a first influence score for a first user from the influence prediction model by providing features extracted from the first user as input to the influence prediction model; and
   based at least in part on the first influence score, identifying the first user as a high value user.

3. The computer-implemented method of claim 2, wherein the communications are promotions.

4. The computer-implemented method of claim 2, further comprising determining whether users were influenced by the communications by determining at least one of a number of purchases made by the users and a monetary total of purchases made by the users during a period of time after sending the communications.

5. The computer-implemented method of claim 2, wherein the user features for the users further comprise at least one of: methods of payment of the users and discount amounts offered to the users.

6. The computer-implemented method of claim 2, wherein the user features for the users further comprise at least one of: locations of user purchases, time of user purchases, and frequency of user purchases.

7. The computer-implemented method of claim 2, wherein training the influence prediction model comprises using a gradient boosting training algorithm taking the derived user features as input.

8. The computer-implemented method of claim 2, further comprising:
    obtaining a first value estimate for the first user;
    determining a first value score for the first user based on the first influence score and the first value estimate; and
    identifying the first user as a high value user responsive to the first value estimate for the first user being higher than value estimates for other users.

9. The computer-implemented method of claim 8, wherein determining the first value estimate for the first user comprises computing a function of average number of purchases by the first user and an average purchase price of purchases by the first user.

10. The computer-implemented method of claim 2, further comprising:
    responsive to identifying the first user as a high value user, sending a promotional communication to the first user.

11. A non-transitory computer-readable storage medium storing instructions executable by a processor, the instructions comprising:
    instructions for sending communications to a set of users;
    instructions for receiving interactions from the users;
    instructions for identifying, based on the received interactions, a set of users that were influenced by the communications;
    instructions for training an influence prediction model based on the identified set of users, wherein the training comprises deriving user features for users of the set of users that were influenced by the communications, and wherein the user features for the users comprise at least one of: email domains of the users, length of time since registration of the users, or length of time from registration of the users to first purchase by the users;
    instructions for obtaining a first influence score for a first user from the influence prediction model by providing features extracted from the first user as input to the influence prediction model; and
    instructions for, based at least in part on the first influence score, identifying the first user as a high value user.

12. The non-transitory computer-readable storage medium of claim 11, the instructions further comprising instructions for determining whether users were influenced by the communications by determining at least one of a number of purchases made by the users and a monetary total of purchases made by the users during a period of time after sending the communications.

13. The non-transitory computer-readable storage medium of claim 11, wherein the user features for the users further comprise at least one of: methods of payment of the users and discount amounts offered to the users.

14. The non-transitory computer-readable storage medium of claim 11, wherein the user features for the users further comprise at least one of: locations of user purchases, time of user purchases, and frequency of user purchases.

15. The non-transitory computer-readable storage medium of claim 11, the instructions further comprising:
    instructions for obtaining a first value estimate for the first user;
    instructions for determining a first value score for the first user based on the first influence score and the first value estimate; and
    instructions for identifying the first user as a high value user responsive to the first value estimate for the first user being higher than value estimates for other users.

16. The non-transitory computer-readable storage medium of claim 15, wherein determining the first value estimate for the first user comprises computing a function of average number of purchases by the first user and an average purchase price of purchases by the first user.

* * * * *